(12) United States Patent
Dubois et al.

(10) Patent No.: US 6,670,515 B1
(45) Date of Patent: Dec. 30, 2003

(54) MATERIAL CONSTITUTED BY ULTRAFINE METALLIC AND OXIDE PARTICLES

(75) Inventors: Jean-Marie Dubois, Pompey (FR); Yves Fort, Vandoeuvre les Nancy (FR); Olivier Tillement, Frolois (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/807,927

(22) PCT Filed: Oct. 18, 1999

(86) PCT No.: PCT/FR99/02492

§ 371 (c)(1),
(2), (4) Date: Aug. 16, 2001

(87) PCT Pub. No.: WO00/23188

PCT Pub. Date: Apr. 27, 2000

(30) Foreign Application Priority Data

Oct. 20, 1998 (FR) .............................................. 98 13113

(51) Int. Cl.[7] .......................... C07C 5/10; C07C 13/465; C07C 5/02; C07C 5/03; B01J 23/58
(52) U.S. Cl. ...................... 585/269; 585/266; 585/270; 585/275; 585/276; 585/277; 502/306; 502/307; 502/308; 502/309; 502/311; 502/312; 502/313; 502/314; 502/315; 502/316; 502/317; 502/318; 502/322; 502/323; 502/327; 502/328; 502/329; 502/330; 502/331; 502/332; 502/333; 502/334; 502/335; 502/336; 502/337; 502/338; 502/339; 502/342; 502/346; 502/348; 502/351; 502/354
(58) Field of Search ...................... 602/114, 258–262, 602/304, 305–306, 307, 308, 309, 311, 312, 313–318, 322, 323, 324, 327–328, 329–339, 342, 346, 348, 351, 354; 585/266, 269, 270, 275, 276, 277

(56) References Cited

U.S. PATENT DOCUMENTS

| | | | | |
|---|---|---|---|---|
| 4,595,429 A | * | 6/1986 | Le Caer et al. | 148/403 |
| 4,710,246 A | * | 12/1987 | Le Caer et al. | 148/403 |
| 5,006,318 A | * | 4/1991 | Demazeau et al. | 423/21.1 |
| 5,032,565 A | * | 7/1991 | Berrebi | 502/331 |
| 5,063,187 A | * | 11/1991 | Burgfels et al. | 502/71 |
| 5,100,858 A | * | 3/1992 | Chopin et al. | 502/350 |
| 5,147,841 A | | 9/1992 | Wilcoxon | |
| 5,204,191 A | * | 4/1993 | Dubois et al. | 428/650 |
| 5,421,919 A | * | 6/1995 | Roman et al. | 148/517 |
| 5,492,879 A | * | 2/1996 | Dye et al. | 502/326 |
| 5,698,487 A | * | 12/1997 | Sacchetti et al. | 502/117 |
| 6,399,533 B2 | * | 6/2002 | Sacchetti et al. | 502/125 |

FOREIGN PATENT DOCUMENTS

| | | |
|---|---|---|
| DE | 44 43 705 | 6/1996 |
| EP | 0 165 177 | 12/1985 |
| WO | WO 97 33690 | 9/1997 |

OTHER PUBLICATIONS

Wei–Yong Yu et al.: "Preparation of Polymer–Protected PT/CO Bimetallic Colloid and It's Catalytic Properties in Selective Hydrogenation of cinnamaldehyde to Cinnamyl Alcohol" Polymers for Advanced Technologies, vol. 7, No. 8, Aug. 1, 1996, pp. 719–722.

* cited by examiner

*Primary Examiner*—Cam N. Nguyen
(74) *Attorney, Agent, or Firm*—Burns, Doane, Swecker & Mathis, L.L.P.

(57) ABSTRACT

A material composed of ultrafine particles, comprising at least a metal element M having catalytic properties and at least a metal element M' having a standard oxidation potential less than that of M, part at least of M' atoms being in oxidized form, the average size of the particles being less than 50 nm, at least 80% in number of the particles having an average size less than 10 nm. One particle of the material is constituted by at least a metal element M with oxidation level 0, or by at least a metal element M' in oxidized form, or by at least a metal element M' with oxidation level 0, or by the combination of at least two species selected from the three previous species. The material is useful as a catalyst for hydrogenation or coupling reactions.

37 Claims, No Drawings

MATERIAL CONSTITUTED BY ULTRAFINE METALLIC AND OXIDE PARTICLES

BACKGROUND OF THE INVENTION

1. Field of the Invention

The present invention relates to a material constituted by ultrafine metallic particles and by ultrafine oxide particles, a process for its preparation, and its utilization, particularly for catalysis.

2. Description of the Related Art

Materials constituted by fine metallic particles are known for diverse applications, particularly in catalysis. Various processes for preparing them have been described.

L. K. Kurihara et al. (Nanostructured Materials, Vol. 5, No. 6, 607–613, 1995) describe the preparation of nanometric metal particles of a metal by a so-called "polyol" process, used for various easily reducible metals such as, for example, Fe, Co, Ni, Cu, Ru, Rh, Pd, Ag, Sn, Re, W, Pt, alone or as a mixture. Such a process consists of dissolving or suspending a precursor of the said metal in a polyol, then heating under reflux to obtain a precipitate of metallic particles. The particles obtained can be nanometric. They are polymetallic when the reaction medium contains salts of different metals. The production of nanometric Cu—Co particles by the polyol process is described in L. K. Kurihara et al., J. Mat. Res., Vol. 10, No. 6, June 1995.

Nanometric particles containing aluminum can be prepared by reducing a salt with $LiAlH_4$. Thus the preparation of nanocrystalline Ti/Al and Ni/Al particles from a chloride of the corresponding metal in the presence of $LiAlH_4$ is described by J. A. Haber et al., Advanced Materials, 1996, 8, No. 2. The reaction mechanism of this process is the following:

$$M^{n+} + nLiAlH_4 \rightarrow nLi_+ + M + nAlH_3 + n/2H_2, nAlH_3 \rightarrow 3n/2H_2,$$

the content of Al having an upper limit corresponding to the valence of the associated metal.

The preparation of nanometric intermetallic particles by means of borohydrides is furthermore known. S. T. Schwab et al., Materials Science and Engineering, A204 (1995) 197–200, describe the preparation of intermetallic particles by the reduction of a mixture of salts of different metals by a borohydride (for example, $TiCl_4 + AlCl_3 +$ lithium triethyl borohydride). This process enables intermetallic particles to be obtained without limitations on the content of the respective metals. It requires a heat treatment at 1,000° C. to decompose the products obtained by the reaction of the salts with the borohydride and to obtain the metallic forms.

The preparation is likewise known of fine monometallic particles by the reaction of a metal salt with sodium hydride in solution in an organic solvent and in the presence of an alcoholate. Such a process has been described for nickel particles and for zinc particles (Paul Caubere et al., J. Am. Chem Soc., 1982, 104, 7130; P. Gallezot, C. Leclercq, Y. Fort, P. Caubére, Journal of Molecular Catalysis, 93 (1994) 79 83, pp. 80–83; Brunet et al., Journal of Organic Chemistry 1980, Vol. 45, pp. 1937–1945). The particles obtained have a crystallite dimension of nm order and are particularly useful as a catalyst for heterogeneous catalysts. When they are prepared in the presence of a phosphine or 2,2'-bipyridine ligand, they lose their reducing properties and behave as a coupling agent (Lourak et al., Journal of Organic Chemistry, 1989, Vol. 54, pp. 4840–4844).

An analogous process has likewise been described for the preparation of monometallic particles of Pd, which can be used as a catalyst for the hydrogenation of acetylene (J. J. Brunet and P. Caubére, J. Org. Chem., 1984, 49, 4058–4060).

The usefulness of ultrafine polymetallic particles as catalysts for various reactions is known. The French patent application No. 97.11814 describes a process which enables ultrafine polymetallic particles to be obtained containing aluminum having good purity, with any given aluminum content. The process consists of reducing a mixture of salts in solution in an organic solvent by means of a hydride of an alkali metal or alkaline earth metal, at a temperature lower than or equal to the reflux temperature of the solvent, the mixture of salts in solution comprising at least one salt of a metal having a standard oxidation potential $E^0(M^{n+}/M)$ at 25° C. greater than −1.18 V. The material obtained by this process is constituted by nanometric polymetallic particles which have a mean crystallite dimension less than 4 nm, in which the various metals present are intimately associated, and which are constituted by at least one metal chosen from the group constituted by Ni, Co, Fe, Cu, Zn, Cd, Cr, Mn, Pd, Ag, Pt, Au, Bi and Sb, and at least one metal chosen from the group constituted by V, Zr, Ce, Ti, Hf and Al. Such a material can be used as a catalyst for diverse reactions, particularly for the hydrogenation of olefins and for the direct coupling of aromatic halogenated derivatives.

SUMMARY OF THE INVENTION

The present inventors have now found a process permitting the preparation of metallic particles which have improved catalytic performance.

The present invention thus has as its object a material constituted by ultrafine metallic particles and by ultrafine oxide particles, a process for its preparation, and also its utilization as a catalyst.

The material which is the object of the present invention comprises at least one metallic element M of degree of oxidation 0 having catalytic properties, and at least one metallic element M' having a standard oxidation potential less than that of the element M, at least a portion of the M' atoms being in an oxidized form; and it is characterized in that:

it is in the form of particles having a mean dimension less than 50 nm, at least 80% by number of the particles having a mean dimension less than 10 nm;

a particle of the material is constituted by
  at least one metallic element M of degree of oxidation 0, or by
  at least one metallic element M' in oxidized form, or by
  at least one metallic element M' of degree of oxidation 0, or by
  the combination of at least two species chosen from the three preceding species, it being understood that the mean content of the element M of degree of oxidation 0 in the material is greater than 25% by number of atoms with respect to the whole of the material, the mean total content of the element M' is at most equal to 75% by number of atoms with respect to the whole of the material, and the mean content of the element M' in the oxidized form is greater than 10% by number of atoms with respect to the total content of the element M'.

A metal M' which has a standard oxidation potential less than that of a metal M is a metal which is easier to oxidize than the metal M.

An element M or M' of degree of oxidation 0 will hereinafter be respectively denoted by M(0) or M'(0).

A material according to the invention can furthermore contain the element M in oxidized form, under the condition that the proportion of the oxidized element M is not greater than 10% by number of atoms with respect to the total quantity of the element M.

The element M is a metal having catalytic properties. It is advantageously chosen from among Pd, Pt, Rh, Ir, Ni, Co, V, Mo, Zn, Cd, Cu, Ag, Au and Fe.

The element M' is chosen from among V, Zr, Ce, Ti, Hf, Al, Ni, Co, Fe, Ru, Cu, Zn, Cd, Cr, Mn, Bi, Sb and Si. The choice of the element M' is made such that the standard oxidation potential of the selected element M' is less than that of the element M with which it is associated. The pairs (M, M') such as (Ni, Fe), (Ni, Al), (Pd, Cu), (Pd, Ni) or (Pd, Al) are particularly preferred.

When M is Ni, Co, or Fe, the mean dimension of the particles constituting the material of the invention is $\leq 10$ nm, 80% by number of the particles having a mean dimension less than 5 nm.

The material of the present invention can be obtained by subjecting to an oxidation, polymetallic particles containing at least one element M(0) having catalytic properties and at least one element M'(0) having a lower standard oxidation potential than that of the metal M, the said particles having a mean dimension less than 50 nm, preferably less than 10 nm. These particles are denoted hereinafter by "[M(0), M'(0)] polymetallic particles". The oxidation is effected by means of oxygen or water. It is particularly advantageous to use the oxygen contained in the air.

The total or partial oxidation of the element M' contained in the [M(0), M'(0)] polymetallic particles brings about the enrichment of the particles in the element M(0) (particularly at the surface of the particles) and the reduction of the mean dimension of the particles. In the obtained particles, the element M(0) and possibly the element M'(0) are intimately associated with an oxidized form of the element M'. According to the oxidizing agent used, the oxidized form of the element M' is an oxide or a hydroxide.

The material of the invention should not contain more than 10% by number of atoms of the element M in the oxidized form, with respect to the total content of the element M. To obtain this result, it is recommended to use the oxidizing agent in a stoichiometric quantity with respect to the element M' to be oxidized, if the total oxidation of M' is desired, or in a sub-stoichiometric quantity if a partial oxidation of M' is desired. In any case, when the element M is a noble metal chosen from among Au, Pd, Pt, it is recommended to use an excess of oxidizing agent.

The [M(0), M'(0)] polymetallic particles subjected to oxidation can be obtained by various processes.

DETAILED DESCRIPTION OF THE INVENTION

In a preferred embodiment of the invention, the [M(0), M'(0)] polymetallic particles are obtained by the reduction of a mixture of salts of the metals M and M' in solution in an organic solvent by means of a hydride of an alkali metal or an alkaline earth hydride. The metal M having a catalytic activity can be chosen from among Pd, Pt, Rh, Ir, Ni, Co, V, Mo, Zn, Cd, Cu, Ag, Au and Fe. The element M' is chosen from among V, Zr, Ce, Ti, Hf, Al, Ni, Co, Fe, Ru, Cu, Zn, Cd, Cr, Mn, Bi, Sb and Si, it being understood that the element M' is chosen such that its standard oxidation potential is less than that of the element M with which it is associated. The salt of the metal M and the salt of the metal M' can be chosen from among the chlorides, bromides, iodides, acetates, acetylacetonates and alcoholates. The proportions of the various salts used for the reaction are chosen as a function of the composition desired for the polymetallic particles, it being understood that the proportions are conserved after reduction by the hydride. When commercial hydrated salts are used, it is preferable to grind them finely before drying them under vacuum, in order to prevent any decomposition. The hydride can be chosen from among LiH, NaH, KH, CaH2 and $MgH_2$. NaH can advantageously be used in the form of a commercial solution, 65% by weight in mineral oil, if necessary after washing with an aprotic organic solvent. LiH can be utilized in the form of a powder such as is available commercially. Such a process of obtaining [M(0), M'(0)] polymetallic particles is described in more detail in the above-cited French patent application No. 97.11814.

In another embodiment, the [M(0), M'(0)] polymetallic particles are obtained by a so-called "polyol" process, by dissolution or by placing a precursor of each of the metals M and M' in suspension in a polyol, then heating under reflux. Such a process is described, for example, in L. K. Kurihara et al., (Nanostructured Materials, Vol. 5, No. 6, 607–613, 1995), or in L. K. Kurihara et al., (J. Mat. Res., Vol. 10, No. 6, June 1995), as cited above.

In another embodiment, the [M(0), M'(0)] polymetallic particles are obtained by reduction of a mixture of salts by $LiAlH_4$. In this case, the hydride can be the source of Al as the element M'. Such a process is described in the above-cited J. A. Haber et al., (Advanced Materials, 1996, 8, No. 2).

In another embodiment, the [M(0), M'(0)] polymetallic particles are obtained by the reduction of a mixture of salts of the metals M and M' by a borohydride, followed by a possible heat treatment, according to a process described, for example, in S. T. Schwab et al. (Materials Science and Engineering, A204 (1995), 197–200). The borohydride is preferably a lithium trialkylborohydride.

The [M(0), M'(0)] polymetallic particles can likewise be obtained in the form of polymetallic colloids by the formation of inverse micelles, as described particularly in U.S. Pat. No. 5,147,841.

The [M(0), M'(0)] polymetallic particles can likewise be obtained by the process described in the patent DE-A-44 43 705. This process permits obtaining in colloidal form, particles associating a metal of group VIII and a metal of group Ib.

When the [M(0), M'(0)] particles are obtained in the form of a suspension in a solvent, they can be subjected to oxidation directly in the solvent. They can also be extracted from the solvent in which they are obtained, to be utilized in the form of a powder.

The process of the invention enables a material to be obtained in the form of particles in which at least 80% of the particles have a mean dimension less than 10 nm, the said particles having a concentration of M(0) higher at the surface of the particle than at the center of the particle.

The particles of the invention can advantageously be used as a catalyst, particularly for hydrogenation reactions or coupling reactions. The [M(0), M'(0)] polymetallic particles in general themselves possess catalytic properties. However, the inventors have observed that a controlled oxidation of these particles, having as a result the partial or total oxidation of the element M' and a possible oxidation of the element M limited to at most 10% by number of atoms of M, enabled a material to be obtained having clearly improved catalytic properties. Indeed, the presence of element M' in the oxidized form brings about a reduction of the particle size, and this increases the specific surface of element M(0) active in catalysis. Furthermore, the presence of the element M' in the oxidized form reduces the tendency toward agglomeration of the M(0) particles, and this increases the life of the catalyst. Lastly, the presence of the element M' in the oxidized form permits a better attachment of the material according to the invention to a support, when the material according to the invention is used as a catalyst carried by a solid support such as, for example, alumina, silica, rutile, cordierite or carbon.

The present invention is described in more detail by means of the following examples, which are given by way of illustration. The invention is not in any case limited to these particular examples, but includes the equivalent materials.

Comparative examples A–G illustrate the preparation of monometallic or polymetallic materials according to the prior art.

Examples 1–8 illustrate the preparation of materials according to the present invention.

Examples 9–14 illustrate the use of particles according to the prior art and of particles according to the invention as catalyst for reactions of hydrogenation of styrene or cyclooctene.

In the following description, "OAc" means "acetate", and "Acac" means "acetylacetonate".

EXAMPLE A

Preparation of Ni—Fe [3/1] Bimetallic Particles

Into a reactor furnished with a refrigerant and a septum, there are introduced 1.29 g (35 mmol) of NaH, 0.89 g (5 mmol) of Ni(OAc)$_2$, and 0.59 g (1.67 mmol) of Fe(Acac)$_3$ in suspension in 40 ml of THF (previously degassed) at a temperature of about 20° C. and under a nitrogen atmosphere. The suspension obtained was heated to reflux (about 63° C.).

With a syringe, 0.74 g (10 mmol) of t-BuOH in solution in 10 ml of previously degassed THF were then introduced dropwise during about 5 min, and the suspension was agitated for about 1 hour at 63° C.

The formation of ultrafine particles was followed by measuring the evolution of hydrogen resulting from the reactions of t-BuONa formation and of reduction of the metallic salts. After the heating period, the particles were completely formed and were evident as a black-colored suspension. They were kept under the atmosphere of hydrogen resulting from the preparation, in order to limit the risk of oxidation.

EXAMPLE B

Preparation of Ni—Fe [3/1] Bimetallic Particles

Ni—Fe [3/1] bimetallic particles were prepared in the same manner as in Example 1 [sic], but using 0.27 g (1.67 mmol) of FeCl$_3$ as the Fe source, and by heating at 63° C. for 6 hours.

EXAMPLE C

Preparation of Pd Monometallic Particles

Monometallic Pd particles were prepared in the same manner as in Example A, but using 1.1 g (30 mmol) of NaH, 1.12 g (5 mmol) of Pd(OAc)$_2$ and 0.74 g (10 mmol) of t-BuOH, and heating at 63° C. for 0.5 hours.

EXAMPLE D

Preparation of Al Monometallic Particles

Monometallic Al particles were prepared in the same manner as in Example A, but using 1.48 g (40 mmol) of NaH, 1.62 g (5 mmol) of Al(Acac)$_3$ and 1.11 g of t-BuOH, and heating at 63° C. for 8 hours.

EXAMPLE E

Preparation of Ni Monometallic Particles

Monometallic Ni particles were prepared in the same manner as in Example A, but using 1.1 g (30 mmol) of NaH, 0.89 g (5 mmol) of Ni(OAc)$_2$ and 0.74 g (10 mmol) of t-BuOH, and heating at 63° C. for 0.5 hours.

EXAMPLE F

Preparation of Cu Monometallic Particles

Monometallic Cu particles were prepared in the same manner as in Example A, but using 1.1 g (30 mmol) of NaH, 0.91 g (5 mmol) of Cu(OAC)$_2$ and 0.74 g of t-BuOH, and heating at 63° C. for 0.5 hours.

EXAMPLE G

Preparation of Pd—Cu [1/1] Bimetallic Particles

Pd—Cu [1/1] bimetallic particles were prepared in the same manner as in Example A, but using 1.48 g (40 mmol) of NaH, 1.12 g (5 mmol) of PD(OAc)$_2$, 0.91 g (5 mmol) of Cu(OAc)$_2$, and 0.74 g of t-BuOH, and heating at 63° C. for 1.5 hours.

EXAMPLE 1

Preparation of Ni—Fe [3/1] Bimetallic Particles Containing Oxidized Iron

At ambient temperature, 15 ml of air were introduced by means of a syringe into a reactor containing the suspension of [Ni—Fe] particles obtained at the end of Example A, and the medium was allowed to react for 1.5 hours.

The product obtained contains oxidized iron, corresponding to 10% in equivalent of Fe(III). Analysis with a transmission electron microscope of the product obtained shows the presence of iron oxides, essentially in the form of FeO, with a crystallite size less than 5 nm.

EXAMPLE 2

Preparation of Ni—Fe [3/1] Bimetallic Particles Containing Oxidized Iron

At ambient temperature, 15 ml of air were introduced by means of a syringe into a reactor containing the suspension of [Ni—Fe] particles obtained at the end of Example B, and the medium was allowed to react for 2 hours. The product obtained contains oxidized iron, corresponding to 10% in equivalent of Fe(III).

EXAMPLE 3

Preparation of Ni—Fe [3/1] Bimetallic Particles Containing Oxidized Iron

At ambient temperature, 37.5 ml of air were introduced by means of a syringe into a reactor containing the suspension of [Ni—Fe] particles obtained at the end of Example A, and the medium was allowed to react for 2 hours. The product obtained contains oxidized iron, corresponding to 25% in equivalent of Fe(III).

EXAMPLE 4

Preparation of Ni—Fe [3/1] Bimetallic Particles Containing Oxidized Iron

At ambient temperature, 75 ml of air were introduced by means of a syringe into a reactor containing the suspension of [Ni—Fe] particles obtained at the end of Example A, and the medium was allowed to react for 2 hours. The product obtained contains oxidized iron, corresponding to 50% in equivalent of Fe(III).

EXAMPLE 5

Preparation of Pd—Al [1/1] Bimetallic Particles Containing 100% Oxidized Aluminum Bimetallic particles were prepared in the same manner as in Example A, but using 1.66 g (45 mmol) of NaH, 1.12 g (5 mmol) of Pd(OAc)$_2$, 1.62 g (5 mmol) of Al(Acac)$_3$, and 0.74 g (10 mmol) of t-BuOH. The reaction was carried out in degassed anhydrous THF, and the reaction medium was heated at 63° C. for 4.5 hours. After return to ambient temperature of the suspension thus obtained, the reactor was connected to a reservoir of air containing about 900 ml of air, and was left to react for 1 hour.

An analysis with a transmission electron microscope by energy loss permitted the conclusion that more than 99% of the aluminum is in the oxidized form.

EXAMPLE 6

Preparation of Ni—Al [3/1] Bimetallic Particles Containing 100% Oxidized Aluminum Bimetallic particles were prepared in the same manner as in Example A, but using 1.29 g (35 mmol) of NaH, 0.89 g (5 mmol) of Ni(OAc)$_2$, 0.54 g (1.67 mmol) of Al(Acac)$_3$, and 0.74 g (10 mmol) of t-BuOH. The reaction was carried out in degassed anhydrous THF, and the reaction medium was heated at 63° C. for 1.5 hours. After return to ambient temperature of the suspension thus obtained, the reactor was connected to a reservoir of air containing about 900 ml of air, and was left to react for 1 hour.

EXAMPLE 7

Preparation of Ni—Al [1/1] Bimetallic Particles Containing 100% Oxidized Aluminum Bimetallic particles were prepared in the same manner as in Example D, but using 1.66 g (45 mmol) of NaH, 0.89 g (5 mmol) of Ni(OAc)$_2$, 1.62 g (5 mmol) of Al(Acac)$_3$, and 0.74 g (10 mmol) of t-BuOH. The reaction was carried out in degassed anhydrous THF, and the reaction medium was heated at 63° C. for 4 hours. After return to ambient temperature of the suspension thus obtained, the reactor was connected to a reservoir of air containing about 900 ml of air, and was left to react for 1 hour.

EXAMPLE 8

Preparation of Pd—Cu [1/1] Bimetallic Particles Containing 100% Oxidized Copper

Bimetallic particles were prepared in the same manner as in Example A, but using 1.48 g (40 mmol) of NaH, 1.12 g (5 mmol) of Pd(OAc)$_2$, 0.91 g (5 mmol) of Cu(OAc)$_2$, and 0.74 g (10 mmol) of t-BuOH. The reaction was carried out in degassed anhydrous THF, and the reaction medium was heated at 63° C. for 1.5 hours. After return to ambient temperature of the suspension thus obtained, the reactor was connected to a reservoir of air containing about 1l of air, and was left to react for 4 hours.

The materials obtained in Examples A–G according to the prior art and Examples 1–8 according to the present invention were used as catalysts for hydrogenation reactions of cyclooctene and styrene. The substrate to be hydrogenated (10 mmol for cyclooctene, 40 mmol for styrene) was dissolved in 15 ml of ethanol, the catalyst was introduced into the solution, and the reaction medium was placed under a hydrogen pressure of $10^5$ Pa. The progress of the reaction was determined by measuring the hydrogen absorbed, and was monitored by gas phase chromatography. The comparative performances of the prior art compounds and the compounds according to the invention are shown in Tables 1–6. The reactivity N of the catalytic system is shown by the number of catalytic cycles expressed in $MN^{-1}$ (turnover number), which corresponds at a given instant to the quantity of substrate consumed per quantity of catalyst and per unit time. Everything being otherwise equal, the greater the number of cycles, the greater the reactivity of the system.

EXAMPLE 9

The materials of Examples A, 1, 3 and 4 were used as catalyst in a styrene hydrogenation reaction. The results are given in Table 1 below.

TABLE 1

| Material | Ex. | Oxidized Fe | N (min$^{-1}$) |
| --- | --- | --- | --- |
| Ni—Fe (3-1) | A | 0 | 16.5 |
| Ni—Fe (3-1) | 1 | 10 | 29.5 |
| Ni—Fe (3-1) | 3 | 25 | 30.5 |
| Ni—Fe (3-1) | 4 | 50 | 19 |

It can be seen that the best catalytic performances were obtained with Ni—Fe (3-1) particles containing Fe in an oxidized state representing 10–25% of equivalent in Fe(III).

EXAMPLE 10

The materials of Examples B and 2 were used as catalyst in a styrene hydrogenation reaction. The results are shown in Table 2.

TABLE 2

| Material | Ex. | Oxidized Fe | N (min$^{-1}$) |
| --- | --- | --- | --- |
| Ni—Fe (3-1) | B | 0 | 5.3 |
| Ni—Fe (3-1) | 2 | 10 | 9.3 |

It can be seen that the best catalytic performances were obtained with Ni—Fe (3-1) particles containing Fe in an oxidized state corresponding to 10% of equivalent in Fe(III).

EXAMPLE 11

The materials of Examples C, D, and 5 were used as catalyst in a styrene hydrogenation reaction. The results are given in Table 3.

TABLE 3

| Material | Ex. | Oxidized Al | N (min$^{-1}$) |
|---|---|---|---|
| Pd | A | 0 | 10.8 |
| Pd—Al (1-1) | 5 | 100 | 13.3 |
| Al | D | 0 | 0 |

EXAMPLE 12

The materials of Examples E, D, 6 and 7 were used as catalyst in a styrene hydrogenation reaction. The results are given in Table 4.

TABLE 4

| Material | Ex. | Oxidized Al | N (min–1) |
|---|---|---|---|
| Ni | E | | 17.1 |
| Ni—Al (3-1) | 6 | 100 | 34.5 |
| Ni—Al (1-1) | 7 | 100 | 37.7 |
| Al | D | 0 | 0 |

The catalytic properties of the particles of the invention are 2–3 times superior to those of the prior art particles of Ni alone.

EXAMPLE 13

The materials of Examples E, D, 6 and 7 were used as catalyst in a cyclooctene hydrogenation reaction. The results are given in Table 5.

TABLE 5

| Material | Ex. | Oxidized Al | N (min$^{-1}$) |
|---|---|---|---|
| Ni | E | | 0.18 |
| Ni—Al (3-1) | 6 | 100 | 0.49 |
| Ni—Al (1-1) | 7 | 100 | 0.31 |
| Al | D | 0 | 0 |

This example confirms that the catalytic properties of the particles of the invention are clearly superior to those of the prior art particles of Ni alone.

EXAMPLE 14

The materials of Examples C, G, F and 8 were used as catalyst in a styrene hydrogenation reaction. The results are given in Table 6.

TABLE 6

| Material | Ex. | Oxidized Cu | N (min$^{-1}$) |
|---|---|---|---|
| Pd | C | | 10.8 |
| Pd—Cu (1-1) | G | 0 | 11.7 |
| Pd—Cu (1-1) | 8 | 100 | 29.6 |
| Cu | F | 0 | 0 |

It can be seen that the catalytic performance is considerably improved by the presence of oxidized Cu.

What is claimed is:

1. A material comprising at least one metallic element M of degree of oxidation 0 having catalytic properties, and at least one metallic element M' having a standard oxidation potential less than that of the element M, at least a portion of the M' atoms is in an oxidized form; wherein:
    the material is in the form of particles having a mean dimension less than 50 nm, at least 80% by number of the particles having a mean dimension less than 10 nm;
    a particle of the material is constituted by:
        at least one metallic element M of degree of oxidation 0,
        at least one metallic element M' in oxidized form,
        at least one metallic element M' of degree of oxidation 0, or
        a combination of at least two species chosen from the three preceding species,
    it is understood that the mean content of the element M of degree of oxidation 0 in the material is greater than 25% by number of atoms with respect to the whole of the material, the mean total content of the element M' is at most equal to 75% by number of atoms with respect to the whole of the material, and the mean content of the element M' in the oxidized form is greater than 10% by number of atoms with respect to the total content of the element M'.

2. The material according to claim 1, which contains an oxidized form of the element M, in a content less than 10% by number of atoms.

3. The material according to claim 1, wherein the oxidized form of the element M' is an oxide or a hydroxide.

4. The material according to claim 1, wherein M is at least one element chosen from among Pd, Pt, Rh, Ir, Ni, Co, V, Mo, Zn, Cd, Cu, Ag, Au and Fe.

5. The material according to claim 4, wherein M' is at least one element chosen from among V, Zr, Ce, Ti, Hf, Al, Ni, Co, Fe, Ru, Cu, Zn, Cd, Mn, Bi, Sb and Si, and has a standard oxidation potential less than that of the element M with which it is associated.

6. The material according to claim 1, wherein the elements (M, M') are chosen from among the pairs (Ni, Fe), (Ni, Al), (Pd, Cu), (Pd, Ni) and (Pd, Al).

7. The material according to claim 1, wherein the metal M is Ni, Co, or Fe, and the mean dimension of the particles is less than 10 nm, at least 80% of the particles by number having a mean dimension less than 5 nm.

8. The material according to claim 1, wherein in the particles containing the metal M of degree of oxidation 0, the concentration of M(0) is greater at the surface of the particle than in the interior of the particle.

9. A process for the preparation of a material according to claim 1, which comprises reacting with an oxidizing agent, polymetallic particles containing at least one metal M of degree of oxidation 0 having catalytic properties and at least one metal M' of degree of oxidation 0 having a standard oxidation potential less than that of the metal M, the said particles having a mean dimension less than 50 nm.

10. The process according to claim 9, wherein the particles have a mean dimension less than 10 nm.

11. The process according to claim 9, wherein the oxidizing agent is oxygen or water.

12. The process according to claim 11, wherein the oxidizing agent is air.

13. The process according to claim 9, wherein the polymetallic particles in which the metal M is a noble metal are treated with an excess of oxidizing agent.

14. The process according to claim 9, wherein a stoichiometric quantity of oxidizing agent is used with respect to the quantity of the metal M'(0) present in the particles to be oxidized.

15. The process according to claim 9, wherein the [M(0), M'(0)] particles are obtained by reduction of a mixture of salts of the metals M and M' in solution in an organic solvent by means of a hydride of an alkali metal or an alkaline earth hydride.

16. The process according to claim 15, wherein the salt of the metal M and the salt of the metal M' are chosen from among chlorides, bromides, iodides, acetates, acetylacetonates, and alcoholates.

17. The process according to claim 15, wherein the hydride is chosen from among LiH, NaH, KH, $CaH_2$, and $MgH_2$.

18. The process according to claim 9, wherein the particles are obtained by dissolution or placing in suspension of a precursor of each of the metals M and M' in a polyol, then heating under reflux.

19. The process according to claim 9, wherein the particles are obtained by reduction of a mixture of salts by $LiAlH_4$.

20. The process according to claim 9, wherein the particles are obtained by reduction of a mixture of salts of the metals M and M' by a borohydride, followed by a heat treatment at a temperature of about 1,000° C.

21. The process according to claim 20, wherein the borohydride is a lithium trialkylborohydride.

22. A catalyst for hydrogenation or coupling reactions comprising a material according to claim 1.

23. A catalyst for hydrogenation or coupling reactions comprising a material according to claim 2.

24. A catalyst for hydrogenation or coupling reactions comprising a material according to claim 3.

25. A catalyst for hydrogenation or coupling reactions comprising a material according to claim 4.

26. A catalyst for hydrogenation or coupling reactions comprising a material according to claim 5.

27. A catalyst for hydrogenation or coupling reactions comprising a material according to claim 6.

28. A catalyst for hydrogenation or coupling reactions comprising a material according to claim 7.

29. A catalyst for hydrogenation or coupling reactions comprising a material according to claim 8.

30. A catalytic process for hydrogenation or coupling reactions which comprises contacting an olefinic compound or an aromatic halogenated compound with the material according to claim 1.

31. A catalytic process for hydrogenation or coupling reactions which comprises contacting an olefinic compound or an aromatic halogenated compound with the material according to claim 2.

32. A catalytic process for hydrogenation or coupling reactions which comprises contacting an olefinic compound or an aromatic halogenated compound with the material according to claim 3.

33. A catalytic process for hydrogenation or coupling reactions which comprises contacting an olefinic compound or an aromatic halogenated compound with the material according to claim 4.

34. A catalytic process for hydrogenation or coupling reactions which comprises contacting an olefinic compound or an aromatic halogenated compound with the material according to claim 5.

35. A catalytic process for hydrogenation or coupling reactions which comprises contacting an olefinic compound or an aromatic halogenated compound with the material according to claim 6.

36. A catalytic process for hydrogenation or coupling reactions which comprises contacting an olefinic compound or an aromatic halogenated compound with the material according to claim 7.

37. A catalytic process for hydrogenation or coupling reactions which comprises contacting an olefinic compound or an aromatic halogenated compound with the material according to claim 8.

* * * * *